(12) United States Patent
Talamine et al.

(10) Patent No.: US 11,114,661 B2
(45) Date of Patent: Sep. 7, 2021

(54) ELECTROCHEMICAL CELL HAVING A SERPENTINE ANODE WITH A PLURALITY OF INTERLEAVED CATHODE PLATES HAVING EXTENDING TABS STACKED AND CONNECTED TO EACH OTHER BY A WELDED SURROUNDING METAL HOOP

(71) Applicant: Greatbatch Ltd., Clarence, NY (US)

(72) Inventors: Kenneth B. Talamine, Plymouth, MN (US); Brian D. Panzer, Williamsville, NY (US)

(73) Assignee: Greatbatch Ltd., Clarence, NY (US)

( * ) Notice: Subject to any disclaimer, the term of this patent is extended or adjusted under 35 U.S.C. 154(b) by 150 days.

(21) Appl. No.: 16/504,423

(22) Filed: Jul. 8, 2019

(65) Prior Publication Data
US 2020/0020940 A1    Jan. 16, 2020

Related U.S. Application Data

(60) Provisional application No. 62/697,456, filed on Jul. 13, 2018.

(51) Int. Cl.
| | |
|---|---|
| *H01M 50/536* | (2021.01) |
| *H01M 4/485* | (2010.01) |
| *H01M 4/48* | (2010.01) |
| *H01M 4/583* | (2010.01) |

(52) U.S. Cl.
CPC ........... *H01M 4/485* (2013.01); *H01M 4/483* (2013.01); *H01M 4/583* (2013.01); *H01M 50/536* (2021.01)

(58) Field of Classification Search
CPC ...... H01M 4/485; H01M 4/483; H01M 4/583; H01M 50/502; H01M 50/538; H01M 50/531; H01M 50/54; H01M 6/103; H01M 2220/30; H01M 50/533; H01M 50/36

See application file for complete search history.

(56) References Cited

U.S. PATENT DOCUMENTS

| | | |
|---|---|---|
| 4,310,609 A | 1/1982 | Liang et al. |
| 4,391,729 A | 7/1983 | Liang et al. |
| 4,830,940 A | 5/1989 | Keister et al. |

(Continued)

OTHER PUBLICATIONS

Extended European Search Report, Application No. 19185995.8, dated Nov. 14, 2019.

*Primary Examiner* — Michael L Dignan
(74) *Attorney, Agent, or Firm* — Michael F. Scalise

(57) ABSTRACT

An electrochemical cell comprising an electrode assembly formed from an elongate anode that is folded into a serpentine configuration with a plurality of cathode plates interleaved between the folds is described. To make a robust and secure connection of the respective cathode tabs to a cathode terminal, the tabs are folded into an overlapping and stacked relationship. The proximal end of a metal strip is wrapped around the stacked cathode tabs and then a laser is used to weld through all layers of the metal strip and each of the bound cathode tabs. The laser welds are visible from the opposite side of the thusly formed strip-shaped hoop surrounding the stacked cathode tabs from which the laser beam first contacted the assembly. This provides the welding engineer with a visual indication that the welded connection of the metal strip-shaped hoop to the stacked cathode tabs is robust and structurally sound.

28 Claims, 9 Drawing Sheets

(56) References Cited

U.S. PATENT DOCUMENTS

| | | | | |
|---|---|---|---|---|
| 4,964,877 A * | 10/1990 | Keister | ............ | A61N 1/378 |
| | | | | 29/623.1 |
| 5,472,810 A | 12/1995 | Takeuchi et al. | | |
| 5,502,292 A | 3/1996 | Pernicka et al. | | |
| 5,516,340 A | 5/1996 | Takeuchi et al. | | |
| 6,551,747 B1 * | 4/2003 | Gan | ............ | H01M 4/06 |
| | | | | 429/245 |
| 6,613,474 B2 | 9/2003 | Frustaci et al. | | |
| 8,609,278 B2 * | 12/2013 | Fuhr | ............ | H01M 10/0587 |
| | | | | 429/209 |
| 9,806,321 B2 * | 10/2017 | Yoo | ............ | H01M 10/052 |
| 9,899,655 B2 | 2/2018 | Dai | | |
| 2002/0146620 A1 * | 10/2002 | Connell | ............ | H01M 50/54 |
| | | | | 429/161 |
| 2011/0206976 A1 * | 8/2011 | Yoo | ............ | H01M 50/54 |
| | | | | 429/153 |
| 2011/0281140 A1 * | 11/2011 | Lee | ............ | H01M 50/538 |
| | | | | 429/7 |
| 2015/0072201 A1 * | 3/2015 | Kubota | ............ | H01M 10/0422 |
| | | | | 429/94 |
| 2015/0136840 A1 * | 5/2015 | Zhao | ............ | B23K 31/02 |
| | | | | 228/160 |
| 2016/0099456 A1 * | 4/2016 | Kwon | ............ | H01M 50/116 |
| | | | | 429/94 |
| 2016/0155996 A1 * | 6/2016 | Dai | ............ | H01M 50/538 |
| | | | | 429/179 |
| 2016/0329546 A1 * | 11/2016 | Ham | ............ | H01M 10/0585 |

* cited by examiner

ELECTROCHEMICAL CELL HAVING A SERPENTINE ANODE WITH A PLURALITY OF INTERLEAVED CATHODE PLATES HAVING EXTENDING TABS STACKED AND CONNECTED TO EACH OTHER BY A WELDED SURROUNDING METAL HOOP

CROSS-REFERENCE TO RELATED APPLICATION

This application claims priority to U.S. Provisional Application Ser. No. 62/697,456, filed on Jul. 13, 2018.

BACKGROUND OF THE INVENTION

1. Field of the Invention

The present invention relates to the conversion of chemical energy to electrical energy. More particularly, the present invention relates to an electrochemical cell having a serpentine anode with folds into which cathode plates are interleaved. The cathode plates have respective extending tabs that are folded into a stack and then bound together with an encircling metal strip-shaped hoop serving as a cathode lead welded to the cathode tabs. A terminal pin hermetically supported in a glass-to-metal seal is connected to the opposite end of the cathode lead to thereby provide the cathode terminal for the cell.

2. Prior Art

U.S. Pat. No. 4,830,940 to Keister et al. relates to an electrochemical cell having a serpentine anode with seven cathode plates interleaved in the anode folds. The second one of the extending cathode tabs is bent underneath the first cathode tab. The third to seventh cathode tabs are then bent so that each of them only touches its immediately proceeding neighbor. The first cathode tab is significantly longer than the others and is bent so that it doubles back over the second to sixth tabs with its distal end contacting the seventh cathode tab. An intermediate lead in the form of a ribbon or strip is fixed at one end to the seventh cathode tab. The opposite end of the intermediate lead is connected to a coupling sleeve. The proximal end of a terminal pin extending through a glass-to-metal seal is fitted into the coupling sleeve to electrically connect the terminal pin to the seven cathode plates. The '940 patent is assigned to the assignee of the present invention and incorporated herein by reference.

U.S. Pat. No. 9,899,655 to Dai relates to an electrochemical cell having a serpentine anode with a plurality of cathode plates interleaved in the anode folds. The first and second cathode tabs each have a first fold so that with the first and second cathodes in a side-by-side arrangement, the first cathode tab lays upon and contacts the second cathode tab. The proximal portion of a cathode lead is contacted to the first cathode tab on an opposite side with respect to where the first tab contacts the second cathode tab. The first and second tabs each have a second fold so that a distal portion of the first cathode tab lays upon and contacts a proximal portion of the cathode lead residing between the proximal and distal portions of the first cathode tab with the distal portion of the second cathode tab laying upon and contacting the distal portion of the first cathode tab. The proximal end of the terminal pin extending through a glass-to-metal seal is electrically connected to the distal portion of the cathode lead to thereby provide the positive terminal for the prior art cell. The '655 patent is assigned to the assignee of the present invention and incorporated herein by reference.

Neither the '940 patent nor the '655 patent has a positive terminal assembly comprising a metal strip-shaped hoop that encircles a plurality of stacked cathode tabs with the encircling metal hoop and cathode tabs being directly welded to each other, as taught in the present invention.

SUMMARY OF THE INVENTION

The present invention describes an electrochemical cell comprising an elongate serpentine anode having at least two folds into which cathode plates are nested or interleaved. The cathode plates have respective extending cathode tabs that are folded into a stack and then bound together with a metal strip forming a hoop that encircles the tabs. A laser weld penetrates through both outer layers of the encircling metal hoop and the stacked cathode tabs. The structural integrity of the laser weld connection is visually evident by viewing the weld from the back side of the encircling strip-shaped hoop with respect to the side that is first contacted by the laser. A terminal pin hermetically supported in a glass-to-metal seal is connected to the opposite end of the metal strip to complete the cathode terminal for the cell.

These and other aspects of the present invention will become increasingly more apparent to those skilled in the art by reference to the following detailed description and to the appended drawings.

DETAILED DESCRIPTION OF THE PREFERRED EMBODIMENTS

Figure 1:
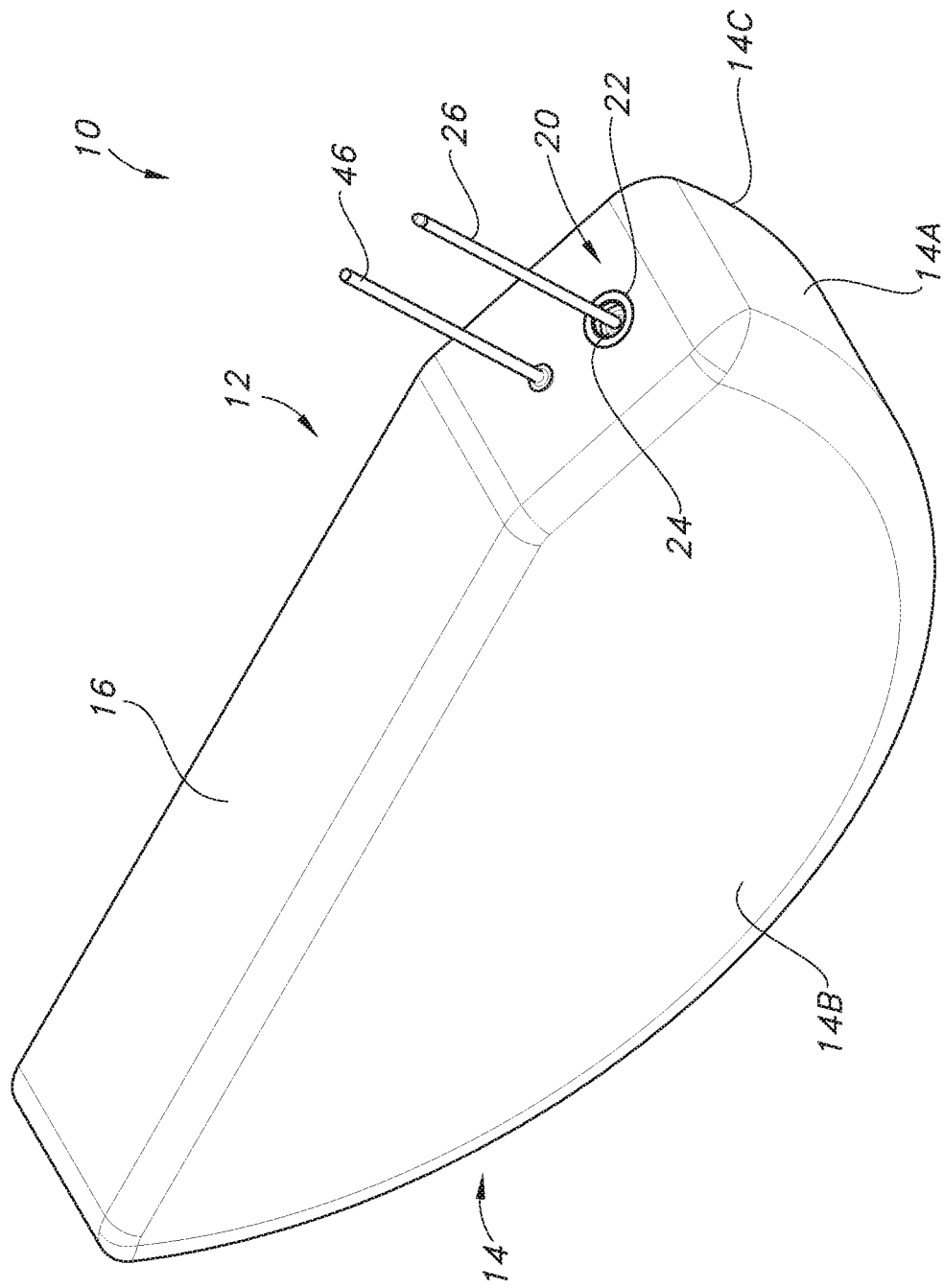
FIG. 1 is a perspective view of an electrochemical cell 10 according to the present invention.

Turning now to the drawings, FIG. 1 is a perspective view of an electrochemical cell 10 according to the present invention. The cell 10 is contained in a hermetically sealed casing 12 comprising an open-ended container 14 closed by a lid 16. After an electrode assembly 18 (FIGS. 3 to 7) is housed inside the container 14, its open-end is closed by the lid 16.

The container 14 comprises a surrounding edge wall 14A joined to a front major sidewall 14B and a back major sidewall 14C. The front and back sidewalls 14B, 14C are substantially parallel to each other.

The surrounding edge wall 14A supports a glass-to-metal seal 20 (GTMS) comprising a ferrule 22 connected to the casing lid 16 in an appropriately sized opening, and a glass or ceramic material 24 that hermetically seals between the ferrule and a terminal pin 26. The terminal pin 26 extends from inside the casing 12 where the pin is electrically connected to one of the anode and the cathode, preferably the cathode, to outside the casing for connection to a load to be powered by the cell 10. That way, the GTMS 20 electrically isolates the terminal pin 26 from the casing 12 with the casing serving as the other terminal for the cell, typically the negative terminal electrically connected to the anode of the electrode assembly 18.

Figure 2:
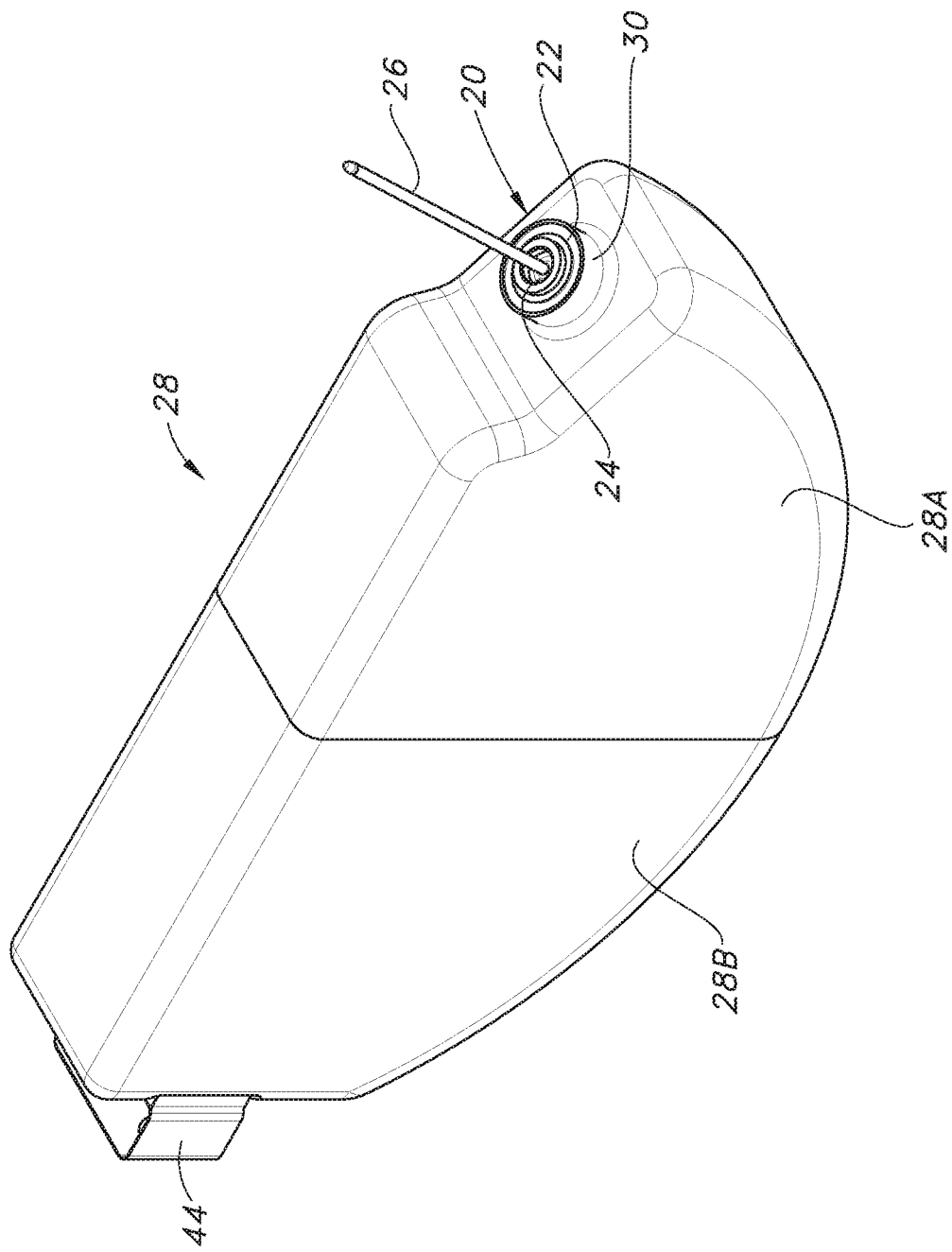
FIG. 2 is a perspective view of the cell 10 shown in FIG. 1, but with the casing 12 removed and the electrode assembly 18 housed in a polymeric envelope 28.

FIG. 2 is a perspective view of the electrochemical cell 10 shown in FIG. 1, but with the casing 12 having been removed from the electrode assembly 18. In that respect, this figure shows that the electrode assembly 18 comprising an anode in electrochemical association with a cathode is housed inside a polymeric envelope 28. The polymeric envelope 28 is comprised of a right-side portion 28A that is mated to a left-side portion 28B. The right-side polymeric portion 28A is contoured to fit snugly over the electrode assembly 18 and has an opening 30 that is sized and shaped to receive the GTMS 20. With the right-side portion of the polymeric envelope in place, the left-side portion 28B is moved over the left end of the electrode assembly 18 until it mates with the right-side portion 28A. In that respect, the left-side polymeric portion 28B is somewhat larger than the right-side portion 28A so that the end of the right-side portion is received inside the left-side portion in a snug-fitting relationship. Alternatively, the right-side polymeric portion 28A is somewhat larger than the left-side portion 283 so that the end of the left-side portion is received inside the right-side portion in a snug-fitting relationship.

FIGS. 3 to 8 show that the electrode assembly 18 is comprised of a relatively long or elongate plate-shaped anode 32 comprising an anode active material, for example lithium, supported on an anode current collector. The anode is folded into a serpentine configuration as described in U.S. Pat. No. 5,147,737 to Post et al., which is assigned to the assignee of the present invention and incorporated herein by reference.

In the exemplary embodiment of the electrochemical cell 10 illustrated in the drawings, nine cathode plates 34A, 34B, 34C, 34D, 34E, 34F, 34G, 34H and 34I reside or are interleaved between adjacent folds of the serpentine anode 32. While nine cathode plates are shown in the exemplary electrochemical cell 10, it is within the scope of the present invention that there can be as few as two cathode plates up to many more than nine plates. Twenty to fifty plates are possible in some cell designs.

Regardless the number of cathode plates, however, the serpentine anode is of a length that is sufficient to have an adequate number of folds so that a cathode plate is nested or interleaved in a fold with the major sides of each cathode plate facing directly to a portion of the anode.

Each cathode plate is comprised of a cathode current collector (not shown) supporting a cathode active material on its opposed major faces or sides. The cathode plates 34A, 34B, 34C, 34D, 34E, 34F, 34G, 34H and 34I are contained in their own separator envelope (not numbered) so that when the cathode plates are interleaved between folds of the serpentine anode, a short-circuit does not occur. In one embodiment, lithium as an exemplary anode active material is supported on the opposed major sides or faces of the anode current collector except for the side portions of the serpentine anode 32 facing outwardly next to the first cathode plate 36A and the ninth cathode plate 36I.

Figure 3:
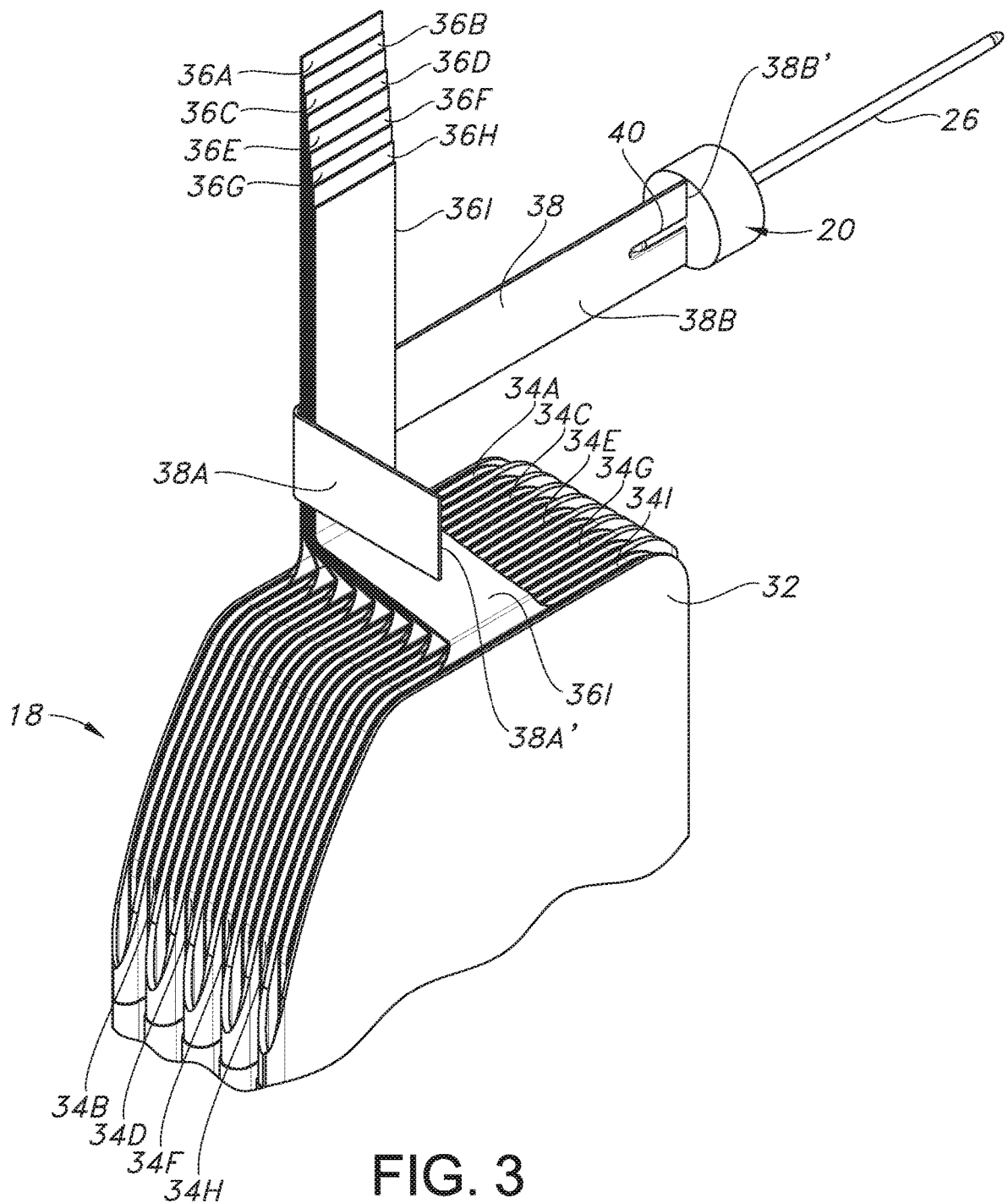
FIG. 3 is a perspective view, partly broken away, showing the extending cathode tabs 36A to 36I folded into a stacked configuration with the proximal portion of a metal strip-shaped hoop 38 supporting a distal glass-to-metal seal 20 partially folded around the tabs.

The cathode plates 34A, 34B, 34C, 34D, 34E, 34F, 34G, 34H and 34I are provided with respective extending tabs 36A, 36B, 36C, 36D, 36E, 36F, 36G, 36H and 34I. FIG. 3 shows that the first cathode tab 36A extends outwardly from its current collector in a substantially co-planar relationship. The other cathode tabs 36B to 36I are bent so that each one lays on top of the next immediately adjacent tab in a stacked relationship. In that respect, the second cathode tab 36B is bent so that it lays against an inner surface of the first cathode tab 36A. The third cathode tab 36C is bent so that it lays against an inner surface of the second cathode tab 36B. The fourth cathode tab 36D is bent so that it lays against an inner surface of the third cathode tab 36C. The fifth cathode tab 36E is bent so that it lays against an inner surface of the fourth cathode tab 36D. The sixth cathode tab 36F is bent so that it lays against an inner surface of the fifth cathode tab 36E. The seventh cathode tab 36G is bent so that it lays against an inner surface of the sixth cathode tab 36F. The eighth cathode tab 36H is bent so that it lays against an inner surface of the seventh cathode tab 36G. And, the ninth cathode tab 36I is bent so that it lays against an inner surface of the eighth cathode tab 36H.

With the cathode tabs 36A to 36I in the bent and stacked relationship shown in FIG. 3, a metal strip 38 having a length extending from a proximal portion 38A having a proximal end 38A' to a distal portion 38B having a distal end 38B' is wrapped around the stacked tabs. First, the proximal portion 38A of the metal strip 38 is bent into a L-shaped configuration and contacted to the aligned edges of the nine tabs and the outer surface of the first cathode tab 36A. The opposed distal portion 38B of the metal strip has an axial slot 40, preferably centered, that receives the proximal end of the terminal pin 26 comprising the GTMS 20.

Figure 4:
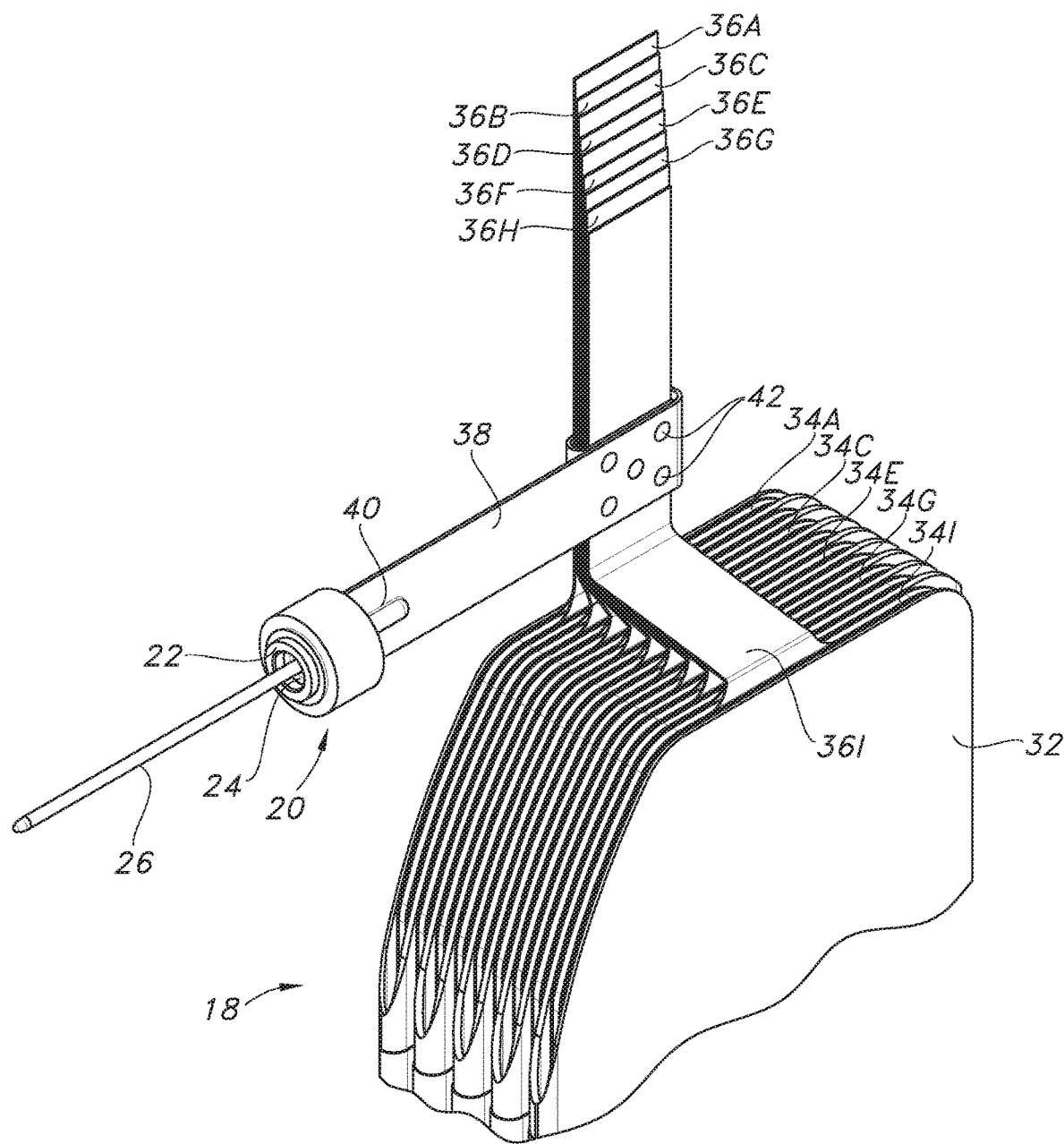
FIG. 4 is a perspective view, partly broken away, showing the strip-shaped hoop 38 of FIG. 3 encircling the bundled cathode tabs 36A to 36I and connected thereto with welds 42.

FIG. 4 shows that the proximal portion 38A (FIG. 3) of the metal strip is bent so that it lays against the inner surface of the ninth cathode tab 36I. In this position, the proximal end 38A' (FIG. 3) of the metal strip 38 is substantially aligned with the edges of the nine tabs 34A to 34I opposite the bend in the initial L-shaped strip configuration shown in FIG. 3.

The distal portion 38B (FIG. 3) of the metal strip connected to the GTMS 20 is then bent backwards 180° so that it lays against the proximal portion 38A of the strip contacting the inner surface of the ninth cathode tab 36I. The metal strip now has the shape of a strip-shaped hoop surrounding or encircling the cathode tabs 36A to 36I.

Figure 6:
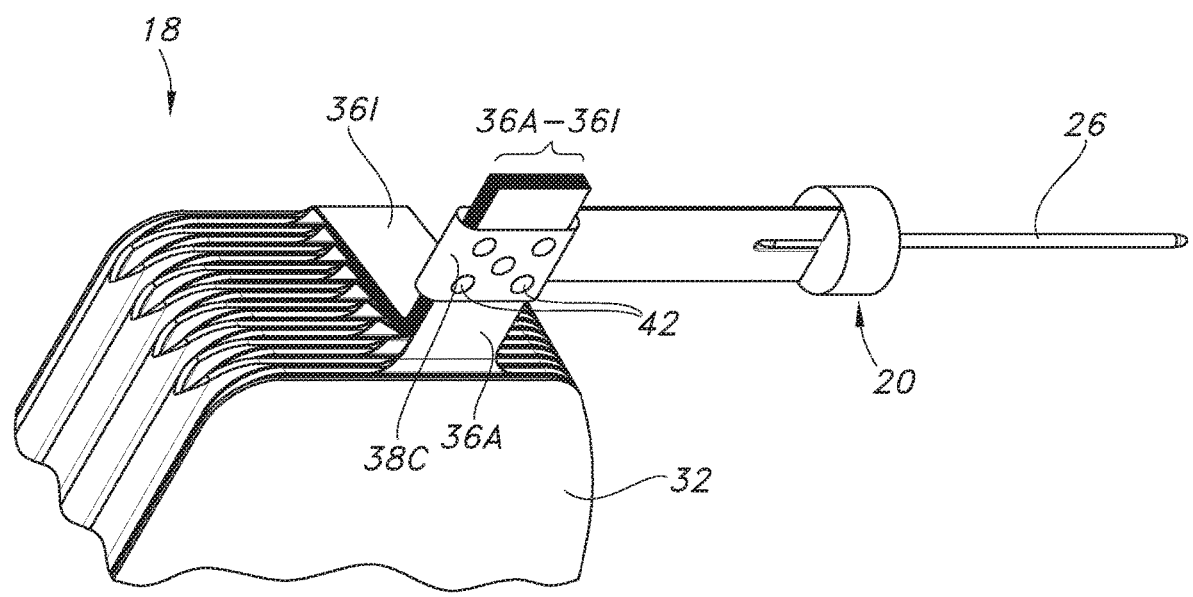
FIG. 6 is a perspective view, partly broken away, of the configuration illustrated in FIG. 5, but from an opposite perspective.

A welding device, for example a laser welder (not shown) is used to connect the backwards bent distal portion 38B to the underlying proximal portion 38A of the metal strip with a series of welds 42. FIG. 6 shows that the welds 42 penetrate completely through the distal portion 38B of the metal strip laying over the proximal portion 38A and through the nine cathode tabs 36A to 36I and then to an intermediate portion 36C of the metal strip. The intermediate portion 38C resides between the proximal portion 38A and the distal portion 38B of the metal strip. Moreover, five welds are shown but that is not intended to be limiting. A lesser or greater number of welds 42 is contemplated by the scope of the present invention. The important aspect is that the metal strip 38 is securely connected to the bent and overlying cathode tabs 36A to 36I so that the strip serves as a band or hoop that confines and joins the cathode tabs together, and that the welds penetrate completely through the various layers so that the welds 42 exist on the "back side" at the intermediate strip portion 38C. That way, weld integrity is visually verifiable.

Figure 5:
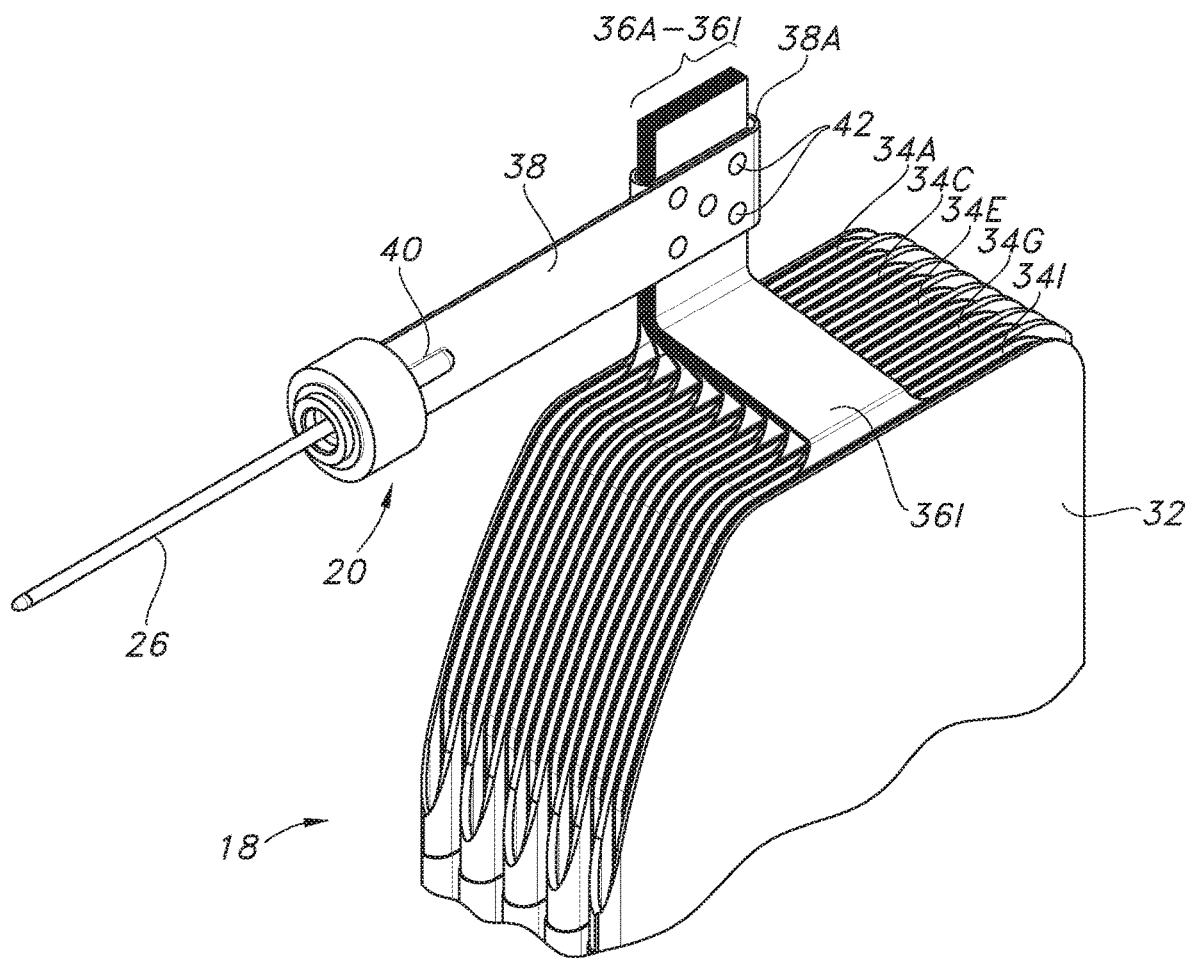
FIG. 5 is a perspective view, partly broken away, showing the trimmed cathode tabs 36A to 36I with the encircling strip-shaped hoop 38.

FIGS. 5 and 6 show that the cathode tabs 36A to 36I are trimmed so that their cut ends are a short distance spaced above the metal band 38 to thereby leave a bundle of extending stubs of the cathode tabs.

Figure 7:
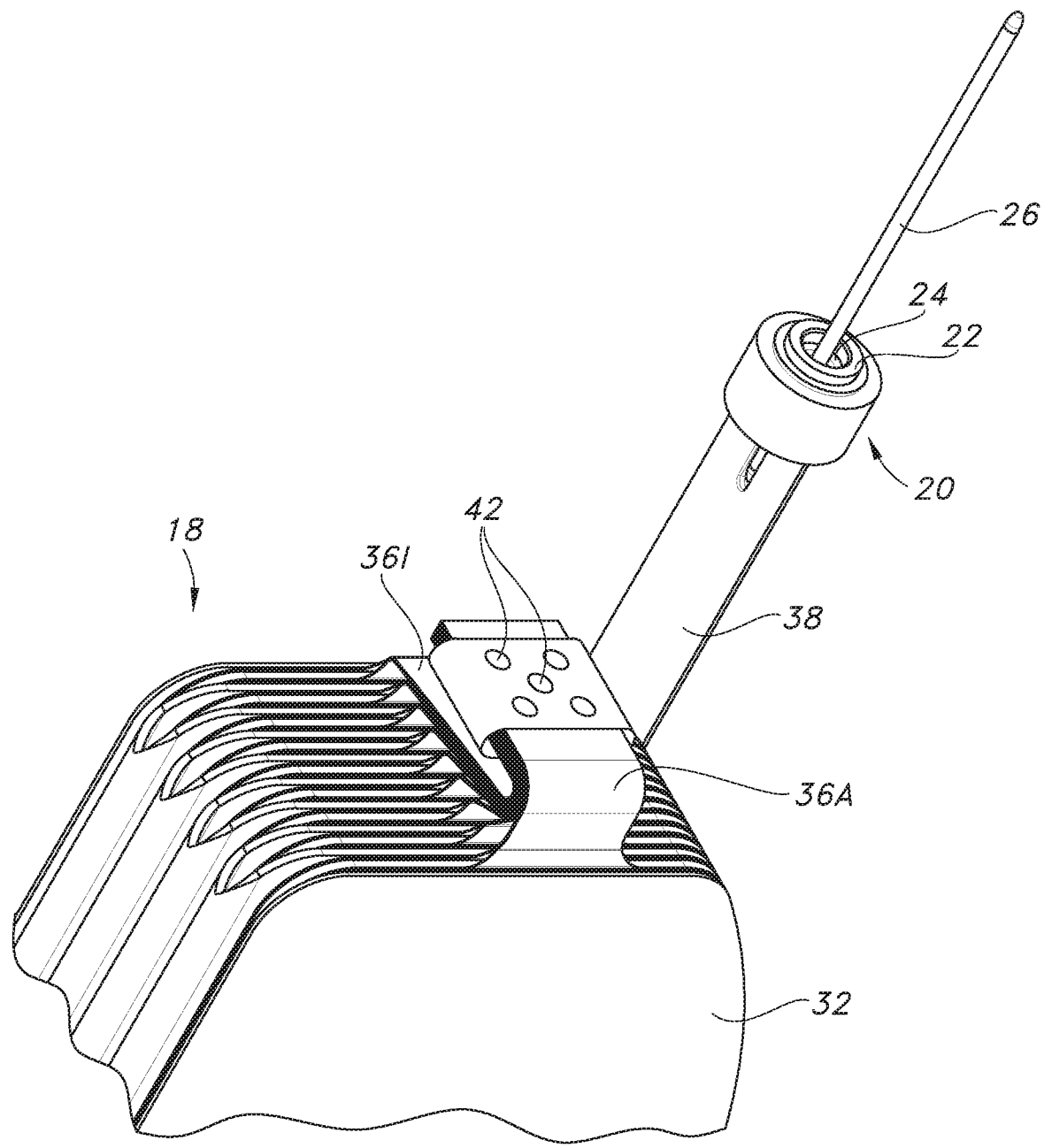
FIG. 7 is a perspective view, partly broken away, of the electrode assembly 18 illustrated in FIG. 6, but with the cathode tabs 36A to 36I bent over the electrode assembly 18 and the strip-shaped hoop 38 bent so that the outwardly extending terminal pin 26 is substantially perpendicular to the upper edge of the electrode assembly.
Figure 8:
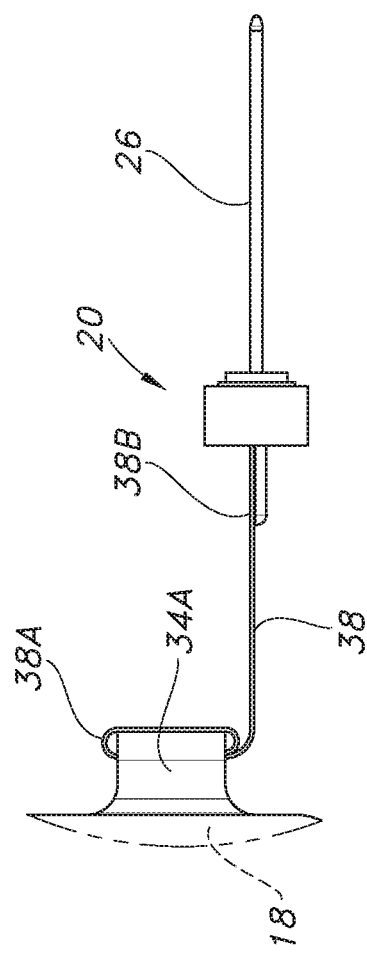
FIG. 8 is a partly broken away side elevational view of the strip-shaped hoop 38 encircling the cathode tabs 36A to 36I and the extending terminal pin 26.

FIG. 7 shows that the banded cathode tabs 36A to 36I have now been folded so that a distal portion of the ninth tab 36I faces its proximal portion in an overlaid relationship. In this configuration, the metal strip 38 resides between the proximal and distal portions of the ninth cathode tab 36I. An outwardly facing side of the first tab 36A distant the ninth tab 36I is spaced furthest from the electrode assembly 18. Then, the metal strip 38 is bent at a right angle proximate the aligned edges of the cathode tabs 36A to 36I. In this configuration, the axis of the terminal pin 26 is substantially perpendicular to the outwardly facing side of the first tab 36A. FIG. 8 is a side view of this configuration.

Figure 9:
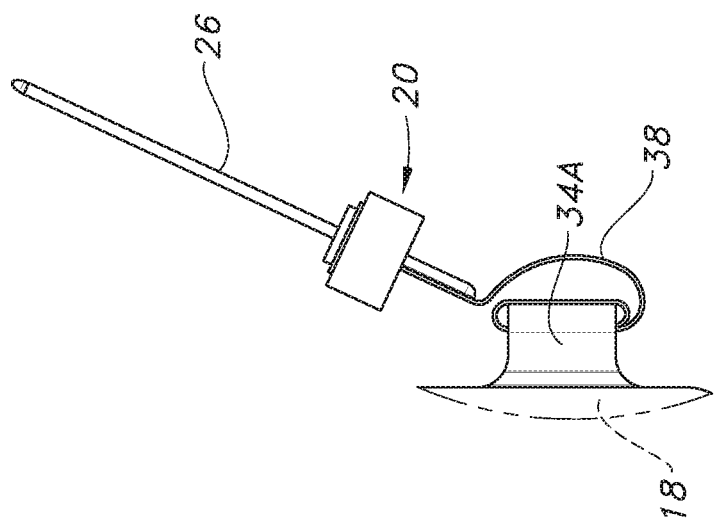
FIG. 9 is a partly broken away side elevational view of a distal portion of the strip-shaped hoop 38 of FIG. 8 bent into a semi-looped configuration.

FIG. 9 shows that the metal strip 38 is then bent into a semi-looped configuration with the axis of the terminal pin 26 being substantially at a 45° angle with respect to the outwardly facing side of the first cathode tab 36A.

Figure 10:
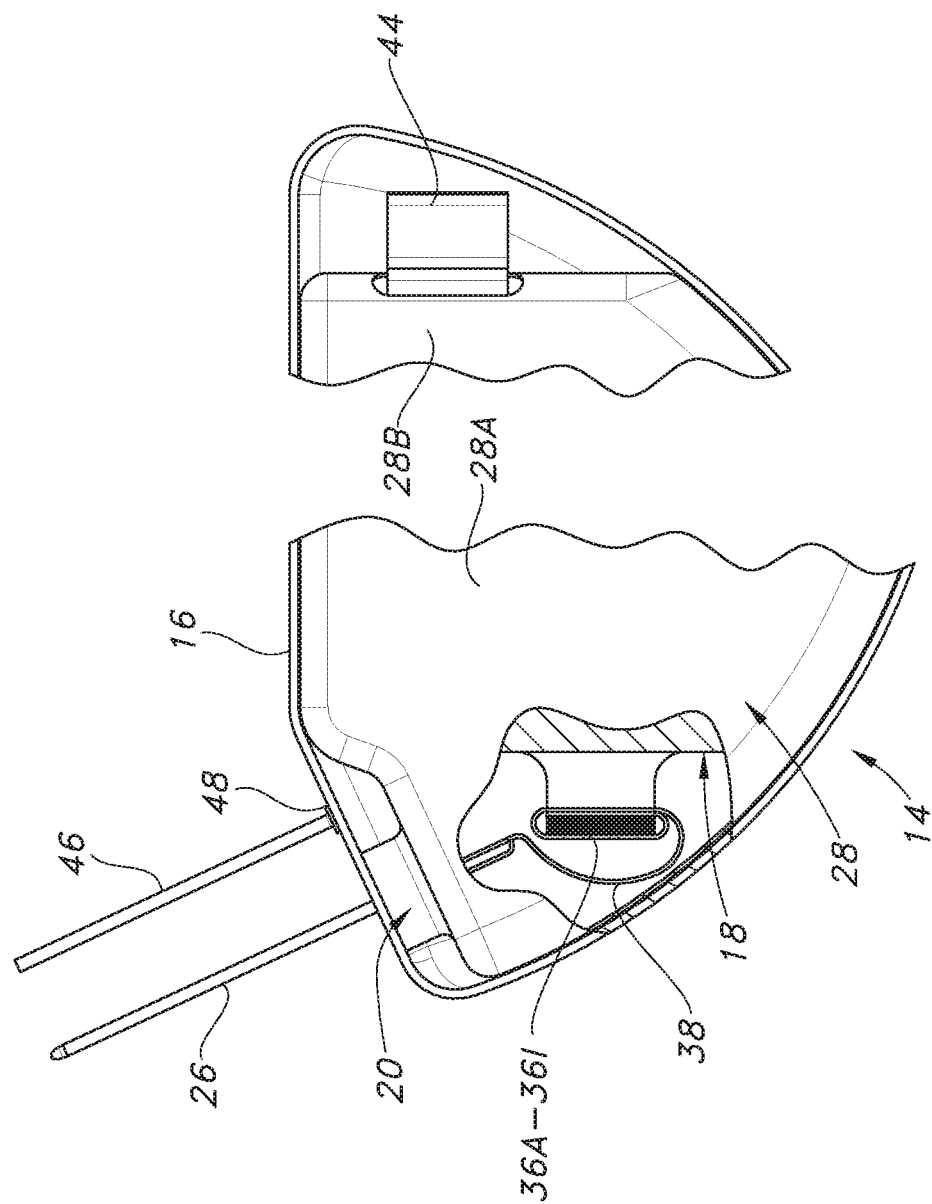
FIG. 10 is a partly broken away side elevational view of the electrode assembly 18 housed inside the metal casing 12 for the electrochemical cell 10 shown in FIG. 1.

FIG. 10 shows the electrode assembly 18 housed in the polymeric envelope 28 with the ferrule 22 of the GTMS 20 secured in the appropriately sized opening 30 in the casing. This drawing also shows that the anode current collector is provided with anode tabs 44 that are connected to an inner surface of the casing. Preferably, there are two anode tabs 44, one extending from each end of the elongate anode. Connection of the anode tabs 44 to the casing 12 is made with tack welds (not shown). That way, the casing 12 serves as the anode or negative terminal for the cell 10. The negative terminal is completed with a negative terminal pin 46 connected to the casing 12 by a weld 48. FIG. 1 shows the negative terminal pin 46 being side-by-side with the positive or cathode terminal pin 26.

Another embodiment of the present invention has the cathode plates 34A, 34B, 34C, 34D, 34E, 34F, 34G, 34H and 34I each of the configuration: SVO/first current collector/ $CF_x$/second current collector/SVO, wherein SVO is silver vanadium oxide. This alternate embodiment for the cathode plates is described in U.S. Pat. No. 6,551,747 to Gan, which is assigned to the assignee of the present invention and incorporated herein by reference. Again, twenty to fifty plates, each of the configuration: SVO/first current collector/ $CF_x$/second current collector/SVO are contemplated in some cell designs.

In a broad sense, the electrochemical cell 10 is of a primary or a secondary chemistry. If of a primary chemistry, the anode comprises metals capable of alloying with lithium at potentials below 1.0 V vs. lithium such as Sn, Si, Al, B, Si—B, and composites of those metals with inactive metals to reduce volume expansion. The form of the anode may vary, but preferably it is of a thin sheet or foil that is pressed, evaporation, or rolled on the metallic anode current collector.

The cathode of a primary cell is of electrically conductive material, preferably a solid material. The solid cathode may comprise a metal element, a metal oxide, a mixed metal oxide, and a metal sulfide, and combinations thereof. A preferred cathode active material is selected from the group consisting of silver vanadium oxide (SVO), copper silver vanadium oxide, manganese dioxide, cobalt nickel, nickel oxide, copper oxide, copper sulfide, iron sulfide, iron disulfide, titanium disulfide, copper vanadium oxide, carbon monofluoride ($CF_x$), and mixtures thereof.

Before fabrication into an electrode for incorporation into the electrochemical cell 10, the cathode active material is mixed with a binder material such as a powdered fluoro-polymer, more preferably powdered polytetrafluoroethylene or powdered polyvinylidene fluoride (PVDF) present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture for the electrochemical cell 10 includes a powdered fluoro-polymer binder present at about 3 weight percent, a conductive diluent present at about 3 weight percent, and about 94 weight percent of the cathode active material.

The primary electrochemical cell 10 includes a nonaqueous, ionically conductive electrolyte having an inorganic, ionically conductive salt dissolved in a nonaqueous solvent and, more preferably, a lithium salt dissolved in a mixture of a low viscosity solvent and a high permittivity solvent. The salt serves as the vehicle for migration of the anode ions to intercalate or react with the cathode active material and suitable salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Suitable low viscosity solvents include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl, formamide, dimethyl acetamide, γ-valerolactone, γ-butyrolactone (GBL), N-methyl-pyrrolidinone (NMP), and mixtures thereof. The preferred electrolyte for a lithium primary cell 10 is 0.8M to 1.5M $LiAsF_6$ or $LiPF_6$ dissolved in a 50:50 mixture, by volume, of PC as the preferred high permittivity solvent and DME as the preferred low viscosity solvent.

By way of example, in an illustrative electrochemical cell, the active material of the cathode is silver vanadium oxide (SVO) as described in U.S. Pat. Nos. 4,310,609 and 4,391,729 to Liang et al., or copper silver vanadium oxide as described in U.S. Pat. Nos. 5,472,810 and 5,516,340 to Takeuchi et al., all assigned to the assignee of the present invention, the disclosures of which are hereby incorporated by reference.

In an exemplary secondary electrochemical cell 10, in addition to lithium, the anode can comprise a material capable of intercalating and de-intercalating an alkali metal, and preferably lithium. A carbonaceous anode comprising any of the various forms of carbon (e.g., coke, graphite, acetylene black, carbon black, glassy carbon, etc.), which are capable of reversibly retaining the lithium species, is preferred. Graphite is particularly preferred due to its relatively high lithium-retention capacity. Regardless the form of the carbon, fibers of the carbonaceous material are particularly advantageous because they have excellent mechanical properties that permit them to be fabricated into rigid electrodes capable of withstanding degradation during repeated charge/discharge cycling.

The cathode of the exemplary secondary electrochemical cell 10 preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$, $LiCo_{1-x}Ni_xO_2$, $LiFePO_4$, $LiNi_xMn_yCo_{1-x-y}O_2$, and $LiNi_xCo_yAl_{1-x-y}O_2$.

For the electrochemical cell 10, the lithiated active material is preferably mixed with a conductive additive selected from acetylene black, carbon black, graphite, and powdered metals of nickel, aluminum, titanium and stainless steel. The cathode further comprises a fluoro-resin binder, preferably in a powder form, such as PTFE, PVDF, ETFE, polyamides and polyimides, and mixtures thereof.

The respective anode and cathode current collectors are selected from stainless steel, titanium, tantalum, platinum, gold, aluminum, cobalt nickel alloys, highly alloyed ferritic stainless steel containing molybdenum and chromium, and nickel-, chromium- and molybdenum-containing alloys. Nickel is preferred for the anode comprising lithium and aluminum is preferred for the cathode current collectors.

Suitable secondary electrochemical systems are comprised of nonaqueous electrolytes of an inorganic salt dissolved in a nonaqueous solvent and more preferably an alkali metal salt dissolved in a quaternary mixture of organic carbonate solvents comprising dialkyl (non-cyclic) carbonates selected from dimethyl carbonate (DMC), diethyl carbonate (DEC), dipropyl carbonate (DPC), ethyl methyl carbonate (EMC), methyl propyl carbonate (MPC), and ethyl propyl carbonate (EPC), and mixtures thereof, and at least one cyclic carbonate selected from propylene carbonate (PC), ethylene carbonate (EC), butylene carbonate (BC), and vinylene carbonate (VC), and mixtures thereof. Organic carbonates are generally used in the electrolyte solvent system for such battery chemistries because they exhibit high oxidative stability toward cathode materials and good kinetic stability toward anode materials.

Whether of a primary or a secondary chemistry, the cell casing 12 is filled with the appropriate electrolyte described hereinabove through a fill opening or port in the casing. The opening is then hermetically sealed such as by close-welding a plug (not shown) in the fill opening using a laser.

Thus, the present invention relates to an electrochemical cell 10 comprising an electrode assembly 18 formed from an elongate anode that is folded into a serpentine configuration with a plurality of cathode plates 34A to 34I nested or interleaved between the folds. To make a robust and secure connection of the respective cathode tabs 36A to 36I to a cathode terminal, the tabs are folded into an overlapping and stacked relationship with each cathode tab touching its immediately adjacent neighbor tab. The proximal end of a metal strip 38 is wrapped around the stacked cathode tabs and then a laser is used to weld through all layers of the metal strip 38 and each of the bound cathode tabs. Preferably, the laser welds are visible from the opposite side of the strip-shaped hoop surrounding the stacked cathode tabs from which the welding device, for example the laser beam of a laser welder, first contacted the assembly. This provides the welding engineer with a visual indication that the welded connection of the metal strip-shaped hoop to the stacked cathode tabs is robust and structurally sound.

The distal end of the metal strip 38 is provided with an axial slot 40 that receives the proximal end of a cathode terminal pin 26. The terminal pin, which is welded to the metal strip 38, is part of a hermetic glass-to-metal seal (GTMS) 20. With the GTMS hermetically secured in an opening in the cell casing 12, the terminal pin 26 is electrically isolated from the casing 12 with the plurality of cathode plates being electrically connected to each other through the welded metal strip 38. Anode tabs 44 extending from the opposite ends of the serpentine anode are tack welded to an inner surface of the casing to thereby complete the case-negative design of the exemplary electrochemical cell 10.

It is appreciated that various modifications to the inventive concepts described herein may be apparent to those of ordinary skill in the art without departing from the spirit and scope of the present invention as defined by the appended claims.

What is claimed is:

1. An electrochemical cell, comprising:
  a) a casing;
  b) an electrode assembly housed inside the casing, the electrode assembly comprising:
    i) at least a first cathode and a second cathode, wherein:
      A) the first cathode comprises a first cathode current collector having a first cathode tab connected to a first cathode plate, wherein a first cathode active material is contacted to the first cathode plate, and wherein the first cathode tab has opposed first and second major sides; and
      B) the second cathode comprises a second cathode current collector having a second cathode tab connected to a second cathode plate, wherein a second cathode active material is contacted to the second cathode plate, and wherein the second cathode tab has opposed third and fourth major sides,
      C) a cathode lead extending from a cathode lead proximal portion to a cathode lead distal portion, wherein, with the first and second cathodes in a side-by-side arrangement, a first section and a second section of the cathode lead proximal portion contact the respective fourth major side of the second cathode tab and the first major side of the first cathode tab with a third section of the cathode lead proximal portion contacting the first section of the cathode lead proximal portion; and
      D) at least one weld contacting the first, second and third sections of the cathode lead proximal portion and the first and second cathode tabs;
    ii) at least one anode positioned between the side-by-side first and second cathodes, the anode comprising an anode current collector having at least one anode tab connected to an anode plate, wherein an anode active material is contacted to the anode plate, and wherein the at least one anode tab is connected to the casing serving as a negative terminal for the cell; and iii) a separator residing between the anode and the first and second cathodes; and c) a feedthrough comprising a terminal pin of a glass-to-metal seal supported by the casing, wherein the terminal pin extends from a terminal pin proximal end electrically connected to the cathode lead distal portion to a terminal pin distal end located outside the casing to thereby serve as a positive terminal for the cell; and d) an electrolyte in the casing activating the electrode assembly.

2. The electrochemical cell of claim 1, wherein the at least one weld penetrates through the first, second and third sections of the cathode lead proximal portion and the first and second cathode tabs so that the weld is visible from both the second and third sections of the cathode lead proximal portion.

3. The electrochemical cell of claim 1, wherein there are a plurality of welds contacting the first, second and third sections of the cathode lead proximal portion and the first and second cathode tabs.

4. The electrochemical cell of claim 1, wherein the electrode assembly further comprises at least a third cathode, and the anode is formed in a serpentine-like shape that weaves between the first, second and third cathodes.

5. The electrochemical cell of claim 1, wherein the first and second cathodes are each of a plate-like structure.

6. The electrochemical cell of claim 1, wherein an axial slot extends into the cathode lead distal portion, and wherein the terminal pin proximal end resides in the axial slot electrically connected to the cathode lead.

7. The electrochemical cell of claim 1, wherein the first and second cathode tabs are folded back upon themselves so that the first and third lead sections of the cathode lead proximal portion reside between a first tab section and a second tab section of the folded first and second cathode tabs.

8. The electrochemical cell of claim 7, wherein the first and second cathode tabs are bent so that an axis of the terminal pin is substantially perpendicular to respective planes of the first, second and third lead sections of the cathode lead proximal portion and the first and second tab sections of the bent first and second cathode tabs.

9. The electrochemical cell of claim 1, wherein the anode active material is lithium and the first and second cathode active materials are selected from the group of silver vanadium oxide, copper silver vanadium oxide, manganese dioxide, cobalt nickel, nickel oxide, copper oxide, copper sulfide, iron sulfide, iron disulfide, titanium disulfide, copper vanadium oxide, and mixtures thereof.

10. The electrochemical cell of claim 1, wherein the anode active material is a carbonaceous material and the first and second cathode active materials are selected from the group of $LiNiO_2$, $LiMn_2O_4$, $LiCoO_2$, $LiCo_{0.92}Sn_{0.08}O_2$, and lithium nickel cobalt oxide.

11. The electrochemical cell of claim 1, wherein the first and second cathode current collectors and the anode current collector are selected from the group of titanium, aluminum, nickel, and stainless steel.

12. The electrochemical cell of claim 1, wherein the electrolyte comprises a conically conductive salt dissolved in a nonaqueous solvent.

13. The electrochemical cell of claim 1, wherein the casing is selected from the group of titanium, nickel, and stainless steel.

14. An electrochemical cell, comprising:

a) a casing;

b) an electrode assembly housed inside the casing, the electrode assembly comprising:
i) at least a first cathode and a second cathode, the first cathode having a first configuration of: SVO (silver vanadium oxide)/first current collector/$CF_x$ (carbon monofluoride)/second current collector/SVO, and the second cathode having a second configuration of: SVO/third current collector/$CF_x$/fourth current collector/SVO, wherein:

A) the first cathode current collector has a first cathode tab with opposed first and second major sides; and B) the second cathode current collector has a second cathode tab with opposed third and fourth major sides;

C) the third cathode current collector has a third cathode tab with opposed fifth and sixth major sides; and D) the fourth cathode current collector has a fourth cathode tab with opposed seventh and eighth major sides;

E) a cathode lead extending from a cathode lead proximal portion to a cathode lead distal portion, wherein, with the first and second cathodes in a side-by-side arrangement, a first section and a second section of the cathode lead proximal portion contact the respective eighth major side of the fourth cathode tab and the first major side of the first cathode tab with a third section of the cathode lead proximal portion contacting the first section of the cathode lead proximal portion; and F) at least one weld contacting the first, second and third sections of the cathode lead proximal portion and the first, second, third and fourth cathode tabs;

ii) at least one anode positioned between the side-by-side first and second cathodes, the anode comprising an anode current collector having at least one anode tab connected to an anode plate, wherein an anode active material is contacted to the anode plate, and wherein the at least one anode tab is connected to the casing serving as a negative terminal for the cell; and iii) a separator residing between the anode and the first and second cathodes; and c) a feedthrough comprising a terminal pin of a glass-to-metal seal supported by the casing, wherein the terminal pin extends from a terminal pin proximal end electrically connected to the cathode lead distal portion to a terminal pin distal end located outside the casing to thereby serve as a positive terminal for the cell; and d) an electrolyte in the casing activating the electrode assembly.

15. The electrochemical cell of claim 14, wherein the at least one weld penetrates through the first, second and third sections of the cathode lead proximal portion and the first, second, third and fourth cathode tabs so that the weld is visible from both the second and third sections of the cathode lead proximal portion.

16. The electrochemical cell of claim 14, wherein there are a plurality of welds contacting the first, second and third sections of the cathode lead proximal portion and the first, second, third and fourth cathode tabs.

17. The electrochemical cell of claim 14, wherein the electrode assembly further comprises at least a third cathode having a third configuration of:

SVO/fifth current collector/CF$_x$/sixth current collector/ SVO,
wherein the fifth cathode current collector has a fifth tab and the sixth current collector has a sixth tab, and
wherein, with the first, second and third cathodes in a side-by-side-by-side arrangement, the at least one weld contacts the first, second and third sections of the cathode lead proximal portion, and the first, second, third, fourth, fifth, and sixth cathode tabs of the respective first, second and third cathodes, and
wherein the anode is formed in a serpentine-like shape that weaves between the first, second and third cathodes.

18. The electrochemical cell of claim 14, wherein an axial slot extends into the cathode lead distal portion, and wherein the terminal pin proximal end resides in the axial slot electrically connected to the cathode lead.

19. The electrochemical cell of claim 14, wherein the first, second, third and fourth cathode tabs are folded back upon themselves so that the first and third lead sections of the cathode lead proximal portion reside between a first tab section and a second tab section of the folded first, second, third and fourth cathode tabs.

20. The electrochemical cell of claim 19, wherein the first, second, third and fourth cathode tabs are bent so that an axis of the terminal pin is substantially perpendicular to respective planes of the first, second and third lead sections of the cathode lead proximal portion and the first and second tab sections of the bent first, second, third and fourth cathode tabs.

21. A method for providing an electrochemical cell, comprising the steps of:
  a) providing an open-ended container;
  b) providing an electrode assembly, comprising:
    i) at least a first cathode and a second cathode, wherein:
      A) the first cathode comprises a first cathode current collector having a first cathode tab connected to a first cathode plate, wherein a first cathode active material is contacted to the first cathode plate, and wherein the first cathode tab has opposed first and second major sides; and
      B) the second cathode comprises a second cathode current collector having a second cathode tab connected to a second cathode plate, wherein a second cathode active material is contacted to the second cathode plate, and wherein the second cathode tab has opposed third and fourth major sides;
    ii) providing a cathode lead extending from a cathode lead proximal portion to a cathode lead distal portion, wherein, with the first and second cathodes in a side-by-side arrangement, wrapping the cathode lead around the first and second cathode tabs so that a first section and a second section of the cathode lead proximal portion contact the respective fourth major side of the second cathode tab and the first major side of the first cathode tab with a third section of the cathode lead proximal portion contacting the first section of the cathode lead proximal portion; and
    iii) welding the first, second and third sections of the cathode lead proximal portion, and the first and second cathode tabs together; and
    iv) positioning at least one anode between the side-by-side first and second cathodes, the anode comprising an anode current collector having at least one tab connected to an anode plate, wherein an anode active material is contacted to the anode plate; and
  c) providing a lid sized and shaped to close the open end of the container;
  d) securing a feedthrough comprising a terminal pin of a glass-to-metal seal in an opening in the lid;
  e) electrically connecting a proximal end of the terminal pin to the cathode lead distal portion;
  f) housing the electrode assembly inside the container and then connecting the at least one anode tab to the container serving as a negative terminal for the cell;
  g) securing the lid to the container to close the open end thereof and thereby provide a casing with a distal end of the feedthrough terminal pin extending outside the casing, the terminal pin serving as a positive terminal for the cell; and
  h) filling an electrolyte into the casing through a fill port and then closing the fill port.

22. The method of claim 21, including welding through the first, second and third lead sections of the cathode lead proximal portion and the first and second cathode tabs to connect them together so that the weld is visible from both the second and third sections of the cathode lead proximal portion.

23. The method of claim 21, including providing a plurality of welds connecting the first, second and third lead sections of the cathode lead proximal portion and the first and second cathode tabs together so that the weld is visible from both the second and third sections of the cathode lead proximal portion.

24. The method of claim 21, including providing the electrode assembly further comprising at least a third cathode in a side-by-side-side arrangement with the first and second cathodes, and forming the anode in a serpentine-like shape that weaves between the first, second and third cathodes.

25. The method of claim 21, including providing the first and second cathodes each being of the configuration: SVO (silver vanadium oxide)/first current collector/CF$_x$ (carbon monofluoride)/second current collector/SVO.

26. The method of claim 21, including providing an axial slot extending into the cathode lead distal portion, and electrically connecting the terminal pin proximal end to the cathode lead in the axial slot.

27. The method of claim 21, including folding the first and second cathode tabs back upon themselves so that the first and third lead sections of the cathode lead proximal portion reside between the first and second tab sections of the folded first and second cathode tabs.

28. The method of claim 27, including bending the first and second cathode tabs so that an axis of the terminal pin is substantially perpendicular to respective planes of the first, second and third lead sections of the cathode lead proximal portion and the first and second tab sections of the bent first and second cathode tabs.

* * * * *

UNITED STATES PATENT AND TRADEMARK OFFICE
CERTIFICATE OF CORRECTION

| | | |
|---|---|---|
| PATENT NO. | : 11,114,661 B2 | |
| APPLICATION NO. | : 16/504423 | |
| DATED | : September 7, 2021 | |
| INVENTOR(S) | : Kenneth B. Talamine and Brian D. Panzer | |

It is certified that error appears in the above-identified patent and that said Letters Patent is hereby corrected as shown below:

In the Claims

Column 9, Line 63 (Claim 12, Line 2) delete "a conically" and insert --an ionically--

Signed and Sealed this
Twenty-eighth Day of February, 2023

Katherine Kelly Vidal
*Director of the United States Patent and Trademark Office*